United States Patent
Li et al.

(10) Patent No.: US 10,748,261 B2
(45) Date of Patent: Aug. 18, 2020

(54) FALSE COLOR REMOVAL METHOD

(71) Applicant: REALTEK SEMICONDUCTOR CORPORATION, Hsinchu (TW)

(72) Inventors: Tsung-Hsuan Li, Taichung (TW); Shang-Lun Chan, Hsinchu (TW); Shih-Tse Chen, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 151 days.

(21) Appl. No.: 16/185,066

(22) Filed: Nov. 9, 2018

(65) Prior Publication Data

US 2019/0147573 A1    May 16, 2019

(30) Foreign Application Priority Data

Nov. 14, 2017   (TW) .............................. 106139356 A

(51) Int. Cl.
| | |
|---|---|
| *G06T 5/00* | (2006.01) |
| *G06T 7/90* | (2017.01) |
| *H04N 1/60* | (2006.01) |
| *H04N 1/58* | (2006.01) |

(52) U.S. Cl.
CPC .............. *G06T 5/009* (2013.01); *G06T 5/005* (2013.01); *G06T 7/90* (2017.01); *H04N 1/58* (2013.01); *H04N 1/60* (2013.01); *H04N 1/6027* (2013.01); *G06T 2207/10024* (2013.01); *G06T 2207/20208* (2013.01)

(58) Field of Classification Search
None
See application file for complete search history.

(56) References Cited

U.S. PATENT DOCUMENTS

| | | | |
|---|---|---|---|
| 9,177,527 B2 * | 11/2015 | Nakagawa | ............... H04N 9/67 |
| 2010/0027886 A1 * | 2/2010 | Kang | ..................... H04N 9/045 |
| | | | 382/167 |

* cited by examiner

*Primary Examiner* — David Perlman
(74) *Attorney, Agent, or Firm* — WPAT, PC

(57) ABSTRACT

The present invention discloses a false color removal method comprising: receiving a current pixel including a first color value, a second color value and a third color value, in which the three color values are composed of a maximum value, a medium value and a minimum value; performing permutation to the maximum value, the medium value and the minimum value to obtain six permutation results; calculating six weighting values, in which a $k^{th}$ weighting value is calculated according to at least a $k^{th}$ permutation result of the six permutation results and the three color values, and the k stands for an integer-variable between one and six; calculating six products, in which a $k^{th}$ product is obtained by multiplying the $k^{th}$ weighting value by the $k^{th}$ permutation result; and using the sum of the six products to update the first, second and third color values.

10 Claims, 3 Drawing Sheets

FALSE COLOR REMOVAL METHOD

BACKGROUND OF THE INVENTION

1. Field of the Invention

The present invention relates to image processing, especially to false color removal of image processing.

2. Description of Related Art

The purpose of false color removal is to remove false color of image data which cannot reflect the true color of a real scene. For instance, the color noise of a gray wall picture is a kind of typical false color; more specifically, the color of a gray wall should be gray while the false color of the gray wall looks like camouflage of mixed colors.

The aforementioned false color is a phenomenon that high saturation color appears in a picture of an object of low color saturation (e.g., gray wall). Human eyes are sensitive to this unnatural phenomenon and will consider that the quality of the picture is not good. To solve this problem, several conventional arts including the art of using a low pass filter and the art of saturation reduction are used.

Regarding the art of using a low pass filter, this art determines a sliding window surrounding a current pixel as a center and then replaces the color of the current pixel with the weighted average or the median of all the pixels within the sliding window. However, the distribution of false color pixels is usually in a pattern of spots instead of points; therefore, the color of most pixels in the size-limited sliding window is still false color, and the color of the weighted average or the median of all the pixels within the sliding window is similar to false color, which means that the art of using a low pass filter cannot remove false color effectively. It should be noted that as the size of the sliding window increases, the size of a buffer for storing all the pixels in the sliding window must increase as well, which causes the rise of cost.

Regarding the art of saturation reduction, the concept of this art is: determining whether a current pixel is in a low saturation region according to the saturation of the current pixel; if the possibility of the current pixel being within the low saturation region is high, reducing the saturation of the current pixel as much as possible. Although this art can effectively reduce false color, it will cause the color distortion of a picture of a light color object. For instance, a light yellow marked region of a map picture will become a light gray marked region after the light yellow marked region is processed by the art of saturation reduction.

SUMMARY OF THE INVENTION

In view of the problems of the prior arts, an object of the present invention is to provide a false color removal method capable of making improvements over the prior arts.

The present invention discloses a false color removal method. An embodiment of the false color removal method includes the following steps: receiving image data including a plurality of pixels including a current pixel, in which the current pixel includes three color values composed of a first color value, a second color value and a third color value, the maximum of the three color values is a maximum value, the medium of the three color values is a medium value and the minimum of the three color values is a minimum value; performing permutation to the maximum value, the medium value and the minimum value to obtain six permutation results, in which each of the six permutation results includes of a first value, a second value and a third value in predetermined order so that the first value is associated with the color of the first color value, the second value is associated with the color of the second color value and the third value is associated with the color of the third color value; calculating six weighting values, in which a $k^{th}$ weighting value of the six weighting values is calculated according to at least a $k^{th}$ permutation result of the six permutation results and according to the first color value, the second color value and the third color value while the k is an integer-variable between one and six; calculating six products, in which a $k^{th}$ product of the six products is obtained by the $k^{th}$ permutation result multiplied by the $k^{th}$ weighting value so that each of the six products includes a weighted-first-value subordinate product, a weighted-second-value subordinate product and a weighted-third-value subordinate product in the predetermined order and consequently the six products include six weighted-first-value subordinate products, six weighted-second-value subordinate products and six weighted-third-value subordinate products; and using a sum of the six weighted-first-value subordinate products to update the first color value, using a sum of the six weighted-second-value subordinate products to update the second color value and using a sum of the six weighted-third-value subordinate products to update the third color value.

Another embodiment of the false color removal method includes the following steps: receiving image data including a plurality of pixels including a current pixel, in which the current pixel includes three color values composed of a first color value, a second color value and a third color value, the maximum of the three color values is a maximum value, the medium of the three color values is a medium value and the minimum of the three color values is a minimum value; performing permutation to the maximum value, the medium value and the minimum value to obtain six permutation results; determining whether the color saturation of the current pixel reaches a predetermined threshold; if the color saturation of the current pixel does not reach the predetermined threshold, using an average or a weighted average of the six permutation results to update the three color values; and if the color saturation of the current pixel reaches the predetermined threshold, using at least one permutation result of the six permutation results to update the three color values, in which the at least one permutation result includes an optimum permutation result among the six permutation results while the optimum permutation result is most similar to the current pixel.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present invention discloses a false color removal method capable of removing false color in a cost-effective manner without causing color distortion. The false color removal method can be carried out by an image processing device. The image processing device includes a processing circuit (e.g., a microprocessor) or a hardware circuit (e.g., a circuit composed of comparators, registers, multipliers and adders) for executing the steps of the false color removal method. Each of the processing circuit and the hardware circuit can be a known or self-developed circuit; in other words, people of ordinary skill in the art can appreciate how to use one or more known circuit(s) with proper hardware/firmware/software modification to implement the present method according to the present disclosure.

Figure 1:
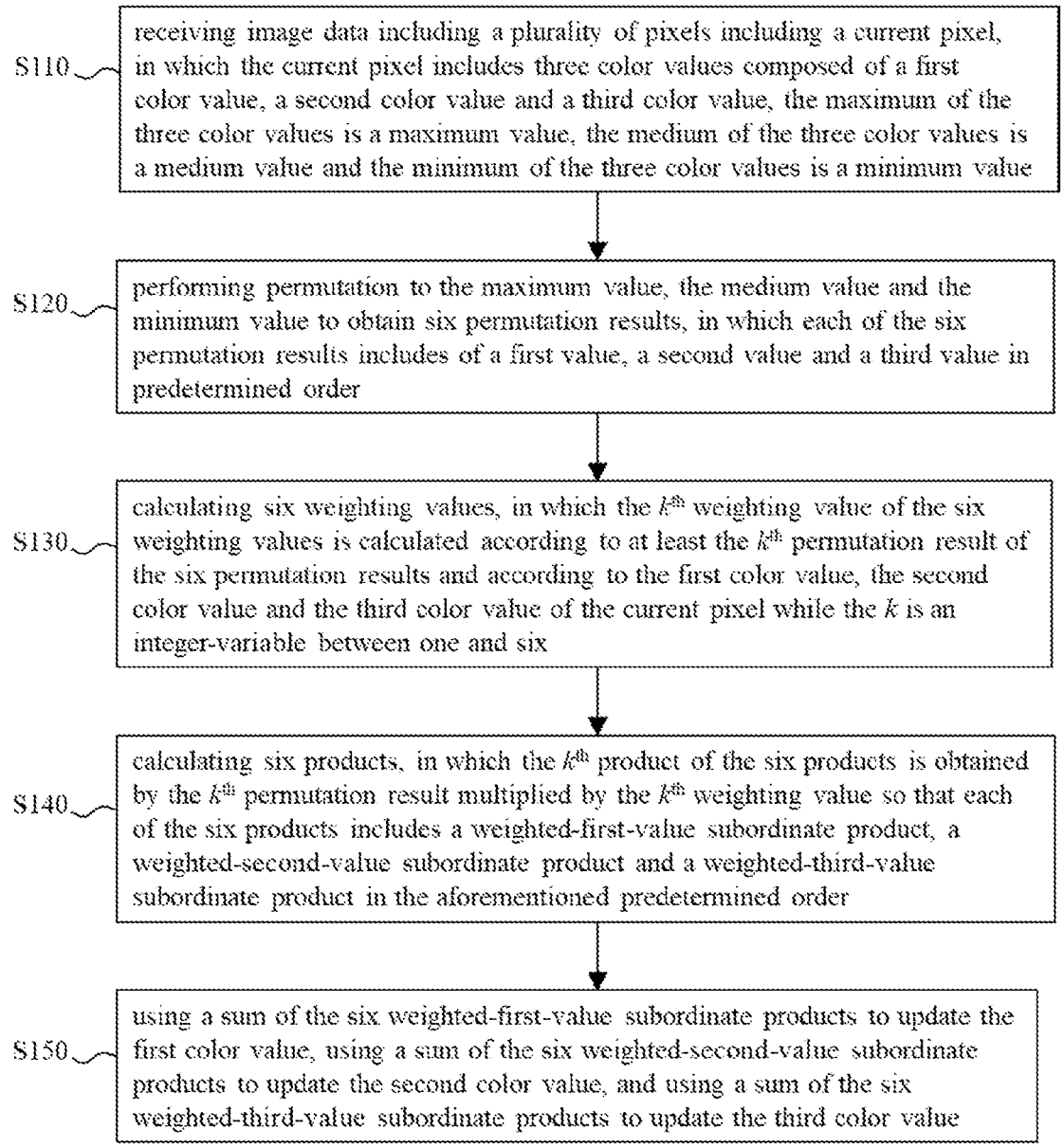
FIG. 1 shows an embodiment of the false color removal method of the present invention.

Please refer to FIG. 1 showing an embodiment of the false color removal method of the present invention. This embodiment includes the following steps:

step S110: receiving image data including a plurality of pixels including a current pixel, in which the current pixel includes three color values composed of a first color value (e.g., a value of red color), a second color value (e.g., a value of green color) and a third color value (e.g., a value of blue color), the maximum of the three color values is a maximum value, the medium of the three color values is a medium value and the minimum of the three color values is a minimum value.

step S120: performing permutation to the maximum value, the medium value and the minimum value to obtain six permutation results, in which each of the six permutation results includes of a first value, a second value and a third value in predetermined order (e.g., an order from the first color value to the third color value) so that the first value is associated with the color (e.g., red) of the first color value, the second value is associated with the color (e.g., green) of the second color value and the third value is associated with the color (e.g., blue) of the third color value. It should be noted that according to the following equation of color saturation calculation and the following equation of brightness calculation, the color saturation of the six permutation results (which are described in detail in later paragraphs) are the same and the brightness of the six permutation results are the same.

$$\text{color saturation} = 1 - \frac{\text{the minimum value}}{\text{the maximum value}}$$

$$\text{brightness} = \frac{\text{first color value} + \text{second color value} + \text{third color value}}{3}$$

step S130: calculating six weighting values, in which the $k^{th}$ weighting value of the six weighting values is calculated according to at least the $k^{th}$ permutation result of the six permutation results and according to the first color value, the second color value and the third color value of the current pixel while the k is an integer-variable between one and six (i.e., k=1, 2, . . . , 5 or 6). For instance, the calculation of step S130 is carried out in accordance with the $k^{th}$ permutation result and the first, second and third color values so as to obtain the $k^{th}$ weighting value; in other words, this calculation needs to use the $k^{th}$ permutation result and the first, second and third color values. For another instance, the calculation of step S130 is carried out in accordance with the $k^{th}$ permutation result, the other five permutation results and the first, second and third color values; in other words, this calculation needs to use the six permutation results and the first, second and third color values. For yet another instance, step S130 includes: calculating according to the $k^{th}$ permutation result and the first, second and third color values to obtain a numerator; calculating according to the six permutation results and the first, second and third color values to obtain a denominator; and dividing the numerator by the denominator to obtain the $k^{th}$ weighting value. It should be noted that in the embodiment of FIG. 1, the $k^{th}$ weighting value is proportional to the similarity between the $k^{th}$ permutation result and the current pixel; in other words, the higher the similarity between the $k^{th}$ permutation result and the current pixel, the greater the $k^{th}$ weighting value.

step S140: calculating six products, in which the $k^{th}$ product of the six products is obtained by the $k^{th}$ permutation result multiplied by the $k^{th}$ weighting value so that each of the six products includes a weighted-first-value subordinate product, a weighted-second-value subordinate product and a weighted-third-value subordinate product in the aforementioned predetermined order and consequently the six products include six weighted-first-value subordinate products, six weighted-second-value subordinate products and six weighted-third-value subordinate products.

step S150: using a sum of the six weighted-first-value subordinate products to update the first color value, using a sum of the six weighted-second-value subordinate products to update the second color value and using a sum of the six weighted-third-value subordinate products to update the third color value; for instance, the updated first color value could be the sum of the six weighted-first-value subordinate products or the derivative thereof, the updated second color value could be the sum of the six weighted-second-value subordinate products or the derivative thereof, and the updated third color value could be the sum of the six weighted-third-value subordinate products or the derivative thereof. In an exemplary implementation, step S150 includes: summing the six weighted-first-value subordinate products up to obtain a first sum, summing the six weighted-second-value subordinate products up to obtain a second sum and summing the six weighted-third-value subordinate products up to obtain a third sum; normalizing the first sum, the second sum and the third sum (or dividing each of the first, second and third sums by a base such as the sum of the six weighting values); and replacing the first, second and third color values with the normalized (or calculated) first, second and third sums respectively. In another exemplary implementation, step S150 includes: replacing the first color value with the first sum, replacing the second color value with the second sum and replacing the third color value with the third sum without doing normalization or division.

In light of the above, in an exemplary implementation of the embodiment of FIG. 1, the first, second and third color values are a red color value $R_{in}$, a green color value $G_{in}$ and a blue color value $B_{in}$ respectively. The maximum one, the medium one and the minimum one among the three color values $R_{in}$, $G_{in}$ and $B_{in}$ are named "max", "med" and "min" respectively while max≥med≥min. Therefore, the aforementioned six permutation results are as follows:

| | |
|---|---|
| $(R_1,G_1,B_1)$=(max,med,min) | first permutation result P1: |
| $(R_2,G_2,B_2)$=(med,max,min) | second permutation result P2: |
| $(R_3,G_3,B_3)$=(min,max,med) | third permutation result P3: |
| $(R_4,G_4,B_4)$=(min,med,max) | fourth permutation result P4: |

Figure 2:
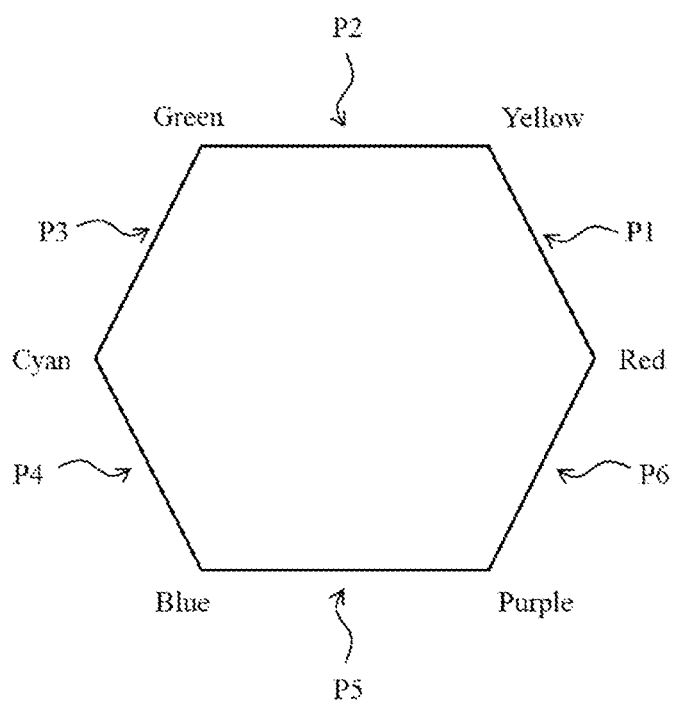
FIG. 2 shows hues in association with the permutation results of the three color values of a current pixel.

$(R_5, G_5, B_5)$=(med,min,max)　　　fifth permutation result P5:

$(R_6, G_6, B_6)$=(max,min,med)　　　sixth permutation result P6:

The hues corresponding to the six permutation results are roughly shown in FIG. 2. By using the six permutation results, step S130 calculates the six weighting values $w_1$, $w_2$, $w_3$, $w_4$, $w_5$ and $w_6$ according one of the following equations:

first equation: $$w_k = \frac{e^{\frac{-1}{2\sigma^2}[(R_k-R_{in})^2+(G_k-G_{in})^2+(B_k-B_{in})^2]}}{\sum_{j=1}^{6} e^{\frac{-1}{2\sigma^2}[(R_j-R_{in})^2+(G_j-G_{in})^2+(B_j-B_{in})^2]}}$$

second equation: $$w_k = \frac{e^{\frac{-1}{2\sigma^2}[|R_k-R_{in}|+|G_k-G_{in}|+|B_k-B_{in}|]}}{\sum_{j=1}^{6} e^{\frac{-1}{2\sigma^2}[|R_j-R_{in}|+|G_j-G_{in}|+|B_j-B_{in}|]}}$$

third equation: $w_k = e^{\frac{-1}{2\sigma^2}[(R_k-R_{in})^2+(G_k-G_{in})^2+(B_k-B_{in})^2]}$ fourth equation: $w_k = e^{\frac{-1}{2\sigma^2}[|R_k-R_{in}|+|G_k-G_{in}|+|B_k-B_{in}|]}$ In the above equations, the k as mentioned in the preceding paragraph is an integer-variable between one and six, and σ is a parameter proportional to noise strength (e.g., noise amplitude). It should be noted that people of ordinary skill in the art can modify any of the four equations or derived an equation according to the present disclosure and their requirements of implementation. After obtaining the six permutation results P1, P2, P3, P4, P5 and P6 and the six weighting values $w_1$, $w_2$, $w_3$, $w_4$, $w_5$ and $w_6$, step S140 can calculate the six products according to the following equations: $w_1 \times P1 = w_1 \times (R_1, G_1, B_1)$, $w_2 \times P2 = w_2 \times (R_2, G_2, B_2)$, $w_3 \times P3 = w_3 \times (R_3, G_3, B_3)$, $w_4 \times P4 = w_4 \times (R_4, G_4, B_4)$, $w_5 \times P5 = w_5 \times (R_5, G_5, B_5)$, and $w_6 \times P6 = w_6 \times (R_6, G_6, B_6)$. Afterwards, step S150 sums the six weighted-first-value subordinate products up (i.e., $w_1 \times R_1 + w_2 \times R_2 + w_3 \times R_3 + w_4 \times R_4 + w_5 \times R_5 + w_6 \times R_6$) to update the first color value $R_{in}$, sums the six weighted-second-value subordinate products up (i.e., $w_1 \times G_1 + w_2 \times G_2 + w_3 \times G_3 + w_4 \times G_4 + w_5 \times G_5 + w_6 \times G_6$) to update the second color value $G_{in}$, and sums the six weighted-third-value subordinate products up (i.e., $w_1 \times B_1 + w_2 \times B_2 + w_3 \times B_3 + w_4 \times B_4 + w_5 \times B_5 + w_6 \times B_6$) to update the third color value $B_{in}$. As it is mentioned in the preceding paragraph, step S150 may normalize each of the above-mentioned sums or divide each of the sums by a base in light of the requirements of implementation; for instance, when the six weighting values are derived from the aforementioned third or fourth equation, step S150 normalizes each sum or divide each sum by a base.

Figure 3:
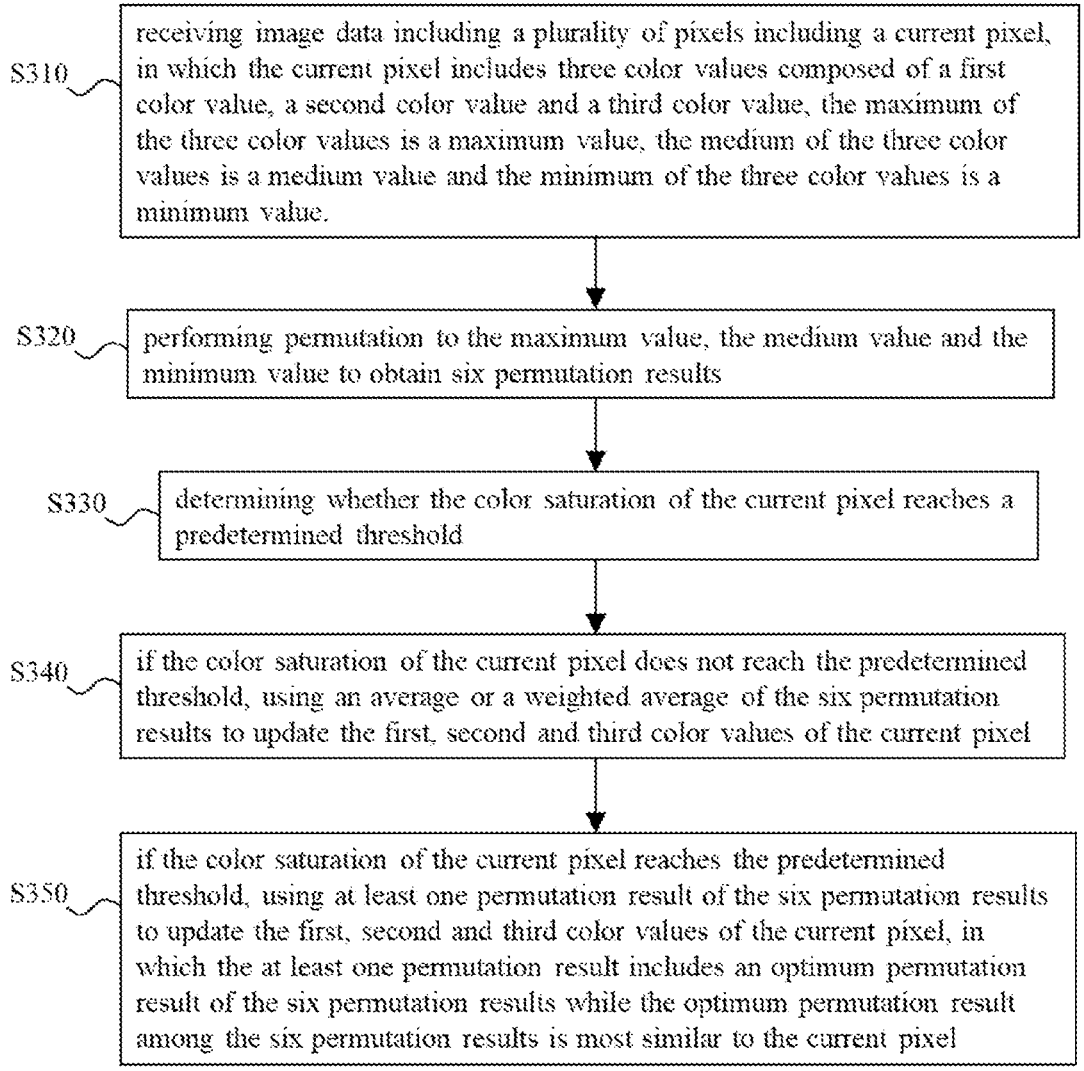
FIG. 3 shows another embodiment of the false color removal method of the present invention.

Please refer to FIG. 3 showing another embodiment of the false color removal method of the present invention. The embodiment of FIG. 3 includes the following steps:

step S310: receiving image data including a plurality of pixels including a current pixel, in which the current pixel includes three color values composed of a first color value, a second color value and a third color value, the maximum of the three color values is a maximum value, the medium of the three color values is a medium value and the minimum of the three color values is a minimum value.

step S320: performing permutation to the maximum value, the medium value and the minimum value to obtain six permutation results.

step S330: determining whether the color saturation of the current pixel reaches a predetermined threshold. For instance, step S330 may use the following equation to obtain the color saturation of the current pixel for the determination:

$$\text{color saturation} = 1 - \left(\frac{\text{the minimum value}}{\text{the maximum value}}\right).$$

According to the above equation, the color saturation of the current pixel is proportional to the difference between the maximum value and the minimum value.

step S340: if the color saturation of the current pixel does not reach the predetermined threshold, using an average or a weighted average of the six permutation results to update the first, second and third color values of the current pixel. For instance, provided the six permutation results of step S340 are the aforementioned permutation results P1, P2, P3, P4, P5 and P6, the average of the six permutation results is $$\left(\frac{R_1+R_2+R_3+R_4+R_5+R_6}{6}, \frac{G_1+G_2+G_3+G_4+G_5+G_6}{6}, \frac{B_1+B_2+B_3+B_4+B_5+B_6}{6}\right);$$

therefore step S340 replaces the first color value $R_{in}$ of the current pixel with $$\frac{R_1+R_2+R_3+R_4+R_5+R_6}{6}$$

of the average, replaces the second color value $G_{in}$ of the current pixel $$\frac{G_1+G_2+G_3+G_4+G_5+G_6}{6}$$

with of the average, and replaces the third color value $B_{in}$ of the current pixel with $$\frac{B_1+B_2+B_3+B_4+B_5+B_6}{6}$$

the average. For another instance, provided the six permutation results are P1, P2, P3, P4, P5 and P6, the weighted average of the six permutation results is ($w_1 \times R_1 + w_2 \times R_2 + w_3 \times R_3 + w_4 \times R_4 + w_5 \times R_5 + w_6 \times R_6$, $w_1 \times G_1 + w_2 \times G_2 + w_3 \times G_3 + w_4 \times G_4 + w_5 \times G_5 + w_6 \times G_6$, $w_1 \times B_1 + w_2 \times B_2 + w_3 \times B_3 + w_4 \times B_4 + w_5 \times B_5 + w_6 \times B_6$); therefore step S340 replaces the first color value $R_{in}$ with ($w_1 \times R_1 + w_2 \times R_2 + w_3 \times R_3 + w_4 \times R_4 + w_5 \times R_5 + w_6 \times R_6$) of the weighted average, replaces the second color value $G_{in}$ with ($w_1 \times G_1 + w_2 \times G_2 + w_3 \times G_3 + w_4 \times G_4 + w_5 \times G_5 + w_6 \times G_6$) of the weighted average, and replaces the third color value $B_{in}$ with ($w_1 \times B_1 + w_2 \times B_2 + w_3 \times B_3 + w_4 \times B_4 + w_5 \times B_5 + w_6 \times B_6$) of the weighted average. It should be noted that if the color saturation of the current pixel is relatively low, each of the six weighting values approximates ⅙.

step S350: if the color saturation of the current pixel reaches the predetermined threshold, using at least one permutation result of the six permutation results to update the first, second and third color values of the current pixel, in which the at least one permutation result includes an optimum permutation result of the six permutation results while the optimum permutation result among the six permutation results is most similar to the current pixel. For instance, provided ($R_{in}$, $G_{in}$, $B_{in}$) stands for the current pixel and ($R_k$, $G_k$, $B_k$) stands for each of the permutation results while k is an integer-variable between one and six, step S350 can find out the optimum permutation result capable of reaching the minimum calculation of the following equation or the modification thereof: $|R_k-R_{in}|+|G_k-G_{in}|+|B_k-B_{in}|$. For another instance, provided the six permutation results are P1, P2, P3, P4, P5 and P6 and the optimum permutation result is P2=($R_2$, $G_2$, $B_2$) (i.e., "$|R_2-R_{in}|+|G_2-G_{in}|+|B_2-B_{in}|$" compared with the other "$|R_k-R_{in}|+|G_k-G_{in}|+|B_k-B_{in}|$" reaches the minimum calculation), step S350 replaces the first color value $R_{in}$ of the current pixel with $R_2$, replaces the second color value $G_{in}$ of the current pixel with $G_2$ and replaces the third color value $B_{in}$ of the current pixel with $B_2$ (or keeps the three color values of the current pixel unchanged). For yet another instance, provided the six permutation results are P1, P2, P3, P4, P5 and P6 and the weighted result of the optimum permutation result P2 is ($w_1 \times R_1 + w_2 \times R_2 + w_3 \times R_3 + w_4 \times R_4 + w_5 \times R_5 + w_6 \times R_6$, $w_1 \times G_1 + w_2 \times G_2 + w_3 \times G_3 + w_4 \times G_4 + w_5 \times G_5 + w_6 \times G_6$, $w_1 \times B_1 + w_2 \times B_2 + w_3 \times B_3 + w_4 \times B_4 + w_5 \times B_5 + w_6 \times B_6$), step S350 replaces the first color value $R_{in}$ of the current pixel with ($w_1 \times R_1 + w_2 \times R_2 + w_3 \times R_3 + w_4 \times R_4 + w_5 \times R_5 + w_6 \times R_6$), replaces the second color value $G_{in}$ of the current pixel with $w_1 \times G_1 + w_2 \times G_2 + w_3 \times G_3 + w_4 \times G_4 + w_5 \times G_5 + w_6 \times G_6$ and replaces the third color value $B_{in}$ of the current pixel with $w_1 \times B_1 + w_2 \times B_2 + w_3 \times B_3 + w_4 \times B_4 + w_5 \times B_5 + w_6 \times B_6$, in which the weighting value $w_2$ approximates one and each of the other weighting values approximates zero.

Since those of ordinary skill in the art can appreciate the detail and the modification of the embodiment of FIG. 3 by referring to the disclosure of the embodiment of FIG. 1, which implies that some or all of the features of the embodiment of FIG. 1 can be applied to the embodiment of FIG. 3 in a reasonable way, therefore repeated and redundant description is omitted here.

To sum up, the present invention can effectively remove false color in a cost-effective way without causing color distortion.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A false color removal method carried out by an image processing device, the false color removal method comprising following steps:

receiving image data including a plurality of pixels including a current pixel, in which the current pixel includes three color values composed of a first color value, a second color value and a third color value, a maximum of the three color values is a maximum value, a medium of the three color values is a medium value and a minimum of the three color values is a minimum value;

performing permutation to the maximum value, the medium value and the minimum value to obtain six permutation results, in which each of the six permutation results includes of a first value, a second value and a third value in predetermined order so that the first value is associated with color of the first color value, the second value is associated with color of the second color value and the third value is associated with color of the third color value;

calculating six weighting values, in which a $k^{th}$ weighting value of the six weighting values is calculated according to at least a $k^{th}$ permutation result of the six permutation results and according to the first color value, the second color value and the third color value while the k is an integer-variable between one and six;

calculating six products, in which a $k^{th}$ product of the six products is obtained by the $k^{th}$ permutation result multiplied by the $k^{th}$ weighting value so that each of the six products includes a weighted-first-value subordinate product, a weighted-second-value subordinate product and a weighted-third-value subordinate product in the predetermined order and consequently the six products include six weighted-first-value subordinate products, six weighted-second-value subordinate products and six weighted-third-value subordinate products; and using a sum of the six weighted-first-value subordinate products to update the first color value, using a sum of the six weighted-second-value subordinate products to update the second color value, using a sum of the six weighted-third-value subordinate products to update the third color value.

2. The false color removal method of claim 1, wherein the $k^{th}$ weighting value is proportional to similarity between the $k^{th}$ permutation result and the current pixel.

3. The false color removal method of claim 1, wherein a step of calculating the $k^{th}$ weighting value includes: obtaining the $k^{th}$ weighting value by calculating according to the $k^{th}$ permutation result, the six permutation results and the three color values.

4. The false color removal method of claim 3, wherein the step of calculating the $k^{th}$ weighting value further includes:

calculating according to the $k^{th}$ permutation result and the three color values to obtain a numerator;

calculating according to the six permutation results and the three color values to obtain a denominator; and dividing the numerator by the denominator to obtain the $k^{th}$ weighting value.

5. The false color removal method of claim 1, wherein a step of updating the three color values includes: replacing the first color value with the sum of the six weighted-first-value subordinate products; replacing the second color value with the sum of the six weighted-second-value subordinate products; and replacing the third color value with the sum of the six weighted-third-value subordinate products.

6. The false color removal method of claim 1, wherein color saturation of the six permutation results is identical and brightness of the six permutation results is identical.

7. A false color removal method carried out by an image processing device, the false color removal method comprising following steps:

receiving image data including a plurality of pixels including a current pixel, in which the current pixel includes three color values composed of a first color value, a second color value and a third color value, a maximum of the three color values is a maximum value, a medium of the three color values is a medium value and a minimum of the three color values is a minimum value;

performing permutation to the maximum value, the medium value and the minimum value to obtain six permutation results;

determining whether color saturation of the current pixel reaches a predetermined threshold;

if the color saturation of the current pixel does not reach the predetermined threshold, using an average or a weighted average of the six permutation results to update the three color values; and if the color saturation of the current pixel reaches the predetermined threshold, using at least one permutation result of the six permutation results to update the three color values, in which the at least one permutation result includes an optimum permutation result among the six permutation results while the optimum permutation result is most similar to the current pixel.

8. The false color removal method of claim 7, wherein a step of using the average or the weighted average to update the three color values includes: replacing the three color values with three average values of the average or three weighted average values of the weighted average.

9. The false color removal method of claim 7, wherein a step of using the at least one permutation result to update the three color values includes: replacing the three color values with optimum values of the optimum permutation result or weighted optimum values of the optimum permutation result.

10. The false color removal method of claim 7, wherein a step of determining whether the color saturation of the current pixel reaches the predetermined threshold includes: determining whether the color saturation of the current pixel reaches the predetermined threshold according to the maximum value and the minimum value, in which the color saturation of the current pixel is proportional to a difference between the maximum value and the minimum value.

* * * * *